Jan. 13, 1959     G. LAZAROWICZ     2,868,339
EXPANSION COMPENSATING COUPLING DEVICE
Filed Sept. 9, 1957     3 Sheets-Sheet 1

INVENTOR
GUSTAW LAZAROWICZ
BY: Maybee Legris
ATTORNEYS

Jan. 13, 1959 G. LAZAROWICZ 2,868,339
EXPANSION COMPENSATING COUPLING DEVICE
Filed Sept. 9, 1957 3 Sheets-Sheet 2

INVENTOR
GUSTAW LAZAROWICZ
BY: Maybee Legris
ATTORNEYS

Jan. 13, 1959  G. LAZAROWICZ  2,868,339
EXPANSION COMPENSATING COUPLING DEVICE
Filed Sept. 9, 1957  3 Sheets-Sheet 3

INVENTOR
GUSTAW LAZAROWICZ
BY: Maybee & Legris
ATTORNEYS

# United States Patent Office 2,868,339
Patented Jan. 13, 1959

2,868,339
EXPANSION COMPENSATING COUPLING DEVICE

Gustaw Lazarowicz, Toronto, Ontario, Canada, assignor to Orenda Engines Limited, Village of Malton, Ontario, Canada, a corporation Application September 9, 1957, Serial No. 682,853

2 Claims. (Cl. 189—36)

This invention relates to a coupling that will maintain constant positional relationship between two parts without inducing physical strain in either part and is applicable where the coupled components are made of dissimilar metals having different thermal expansion coefficients and which, therefore, change physical size at different rates under the influence of a change in temperature.

The invention may be employed in any location where it is contemplated that one part will be likely to change dimensions more than another part either due to its being made of a metal having a coefficient of thermal expansion which is different from the coefficient of expansion of the other part or due to one part being subjected to a greater or lesser amount of heat than the other part.

The invention may also be applied as a means for maintaining the concentricity of two shaft flanges which either have different coefficients of thermal expansion or which are subjected to different temperatures, for example, as a thrust bearing support for a shaft in a gas turbine engine.

The invention will be described in the following specification and illustrated in the accompanying drawings in which like reference numerals refer to like parts in the various views and in which.

Figure 1:
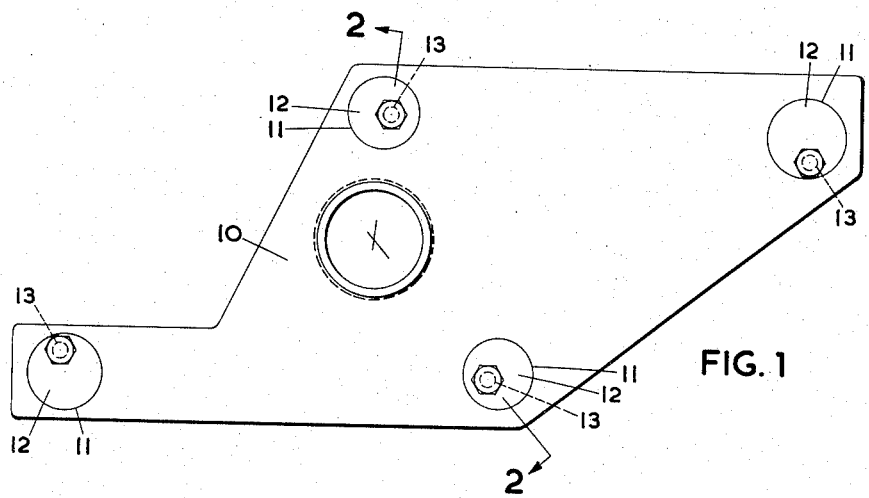
Figure 1 is a plan view of one member of one embodiment of the invention.
Figure 3:
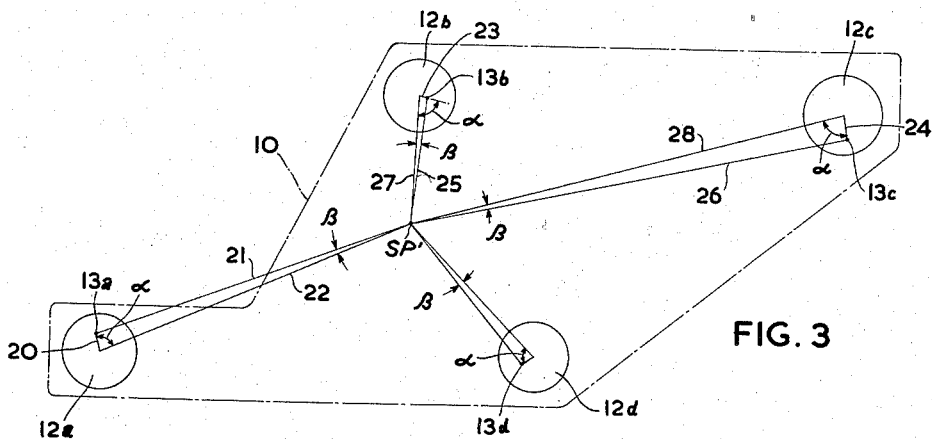
Figure 3 is a schematic diagram of the member shown in Figure 1.

Broadly stated, the invention comprises a first member which may be considered to be the member 10 shown in Figures 1 and 3 which is provided with at least three bores 11 each of which has an internal surface of revolution. The axes of revolution of the internal surfaces of the bores 11 are parallel to one another and are preferably normal to the surface of the member 10.

In each bore 11 is positioned a bushing 12 which has an external surface complementary to the internal surface of the bore so that it may rotate in the bore about its own axis. Each bushing 12 is provided with a hole 13 eccentric with the axis of the bushing. It will be obvious that the material from which the bushings are made must have a coefficient of expansion which is no greater than that of the member 10 and which is as close to identical to that of member 10 as is possible.

Figure 2:
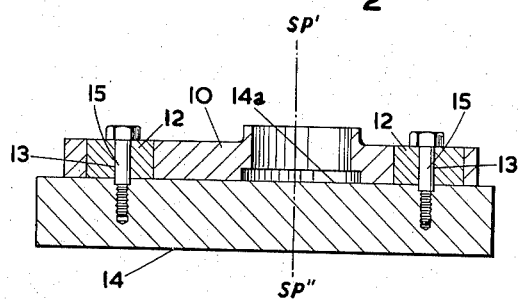
Figure 2 is a cross-section view of a coupling, one of the members being that illustrated in Figure 1 and the section being taken along line 2—2 of that member of Figure 1.

Referring now to Figure 2 it will be seen that a second member 14 is provided with a series of pins 15 fixed therein and extending from its surface 14a, the pins being equal in number to the number of bushings in the first member and positioned for one pin 15 to be received in the hole 13 in each bushing 12 on the first member 10.

When the two members 10 and 14 are assembled in the condition shown in Figure 2 it will be seen, from a consideration of Figure 1, that expansion of one member relative to the other or, obviously, contraction of one member relative to the other, will result in the pins 15 in the holes 13 in the bushings 12 tending to rotate the bushings 12 about their own axes to accommodate the change in dimension of one member relative to the other.

In order for this dimensional change to be accommodated in accordance with the present invention, however, certain conditions must be fulfilled.

As a preliminary step it is desired to define certain terms which will be employed in the following description and in the claims.

*Axis.*—The term "axis" is used only with respect to bores, bushings, holes and pins each of which has an internal or external surface of revolution and the axis is that axis about which the surface of revolution may be generated.

"Distance between axes" or "line joining axes" is to be interpreted as the distance measured or a line drawn in a plane perpendicular to one of the axes.

"Eccentric" when used to describe the holes in the bushings is to be interpreted as meaning that the axis of the hole does not coincide with the axis of the bushing although the hole itself is concentric about its own axis.

"Angle subtended at an axis" is to be construed as referring to an angle, the defining lines of which lie in a plane normal to the axis at which lies the vertex of the angle.

*Expansion.*—The term "expansion" is used in the specification and in the claims in a relative sense and one member is said to expand relative to another for convenience in terminology. It is intended, however, that this term be construed as including the situation where one member contracts relative to the other.

Firstly, it is derised that a predetermined selected point on one member be maintained in a constant position in relation to a corresponding selected point on the other member. Accordingly, in Figures 1, 2 and 3 the selected point on the member 10 is illustrated by the reference character SP′ while in Figure 2 the selected point on the second member 14 is indicated by the reference character SP″.

Referring now to Figure 3 the conditions which must be fulfilled in order for the device to operate in the desired manner will be explained.

It will be observed in Figure 3 that SP′ has been indicated as lying within the confines of the first member 10 but at a point which is not equidistant from the axes of the four bushings.

In this figure the bushings have been indicated by reference characters 12a, 12b, 12c and 12d reading in a clockwise direction.

The first condition that must be fulfilled is that a first angle subtended at the selected point by a line joining the axis of a bushing and the axis of the hole in that bushing must be equal to a similar angle associated with each other bushing. Referring to Figure 3, and bushing 12a, it will be seen that line 20 joining the axis of bushing 12a and the axis of the hole 13a in that bushing subtends at SP′ an angle $\beta$ defined by lines 21 and 22. This angle $\beta$ is equal to angle $\beta$ associated with each of bushings 12b, 12c and 12d.

Since the distances of the bushings from the selected point SP′ are unequal but all angles $\beta$ are equal it follows that the distance between, for example, the axis of bushing 12b and the axis of its hole 13b is not equal to the distance between the axis of bushing 12c and the axis of its hole 13c. It will be observed that bushing 12c is further from SP' than is bushing 12b and that line 23 joining the axis of bushing 12b and the axis of hole 13b is, accordingly, shorter than line 24 joining the axis of bushing 12c and the axis of its hole 13c. Since, however, the increase in the length of line 25 under the influence of a temperature rise in member 14 will be smaller than the increase in length of line 26 under the same temperature rise, the selected point SP' will not move and bushings 12b and 12c will rotate through equal angular displacements in the same direction so that no tensional or compressional forces will be set up in the material between bushings 12b and 12c.

The second condition which must be met is that the second angle formed at the axis of one bushing by a line joining the axis of the hole in that bushing and the axis of the bushing and a line joining the selected point and the axis of the bushing, is equal to a similar angle associated with all other bushings.

Referring to Figure 3 it will be seen with respect to bushings 12b and 12c that the angles α defined by lines 23 and 27 in the case of bushing 12b and angle α defined by lines 24 and 28 in the case of bushing 12c are equal.

When expansion of the second member 14 or, conversely when the contraction of the first member 10 occurs, the pins 15 will tend to rotate the bushings 12a, 12b, 12c and 12d in a counterclockwise direction when viewed as in Figure 3. This would be the case if the pins were located within the boundary of, for example, bushing 12c at any point along line 26. If, however, angle α of bushing 12c were not equal to angle α of bushing 12b which, in Figure 3, is less than 90° but were, let it be assumed, greater than 90° but less than 180°, then the movement of the two pins would be such as to set up stresses in member 14 since the angular displacement of bushing 12b would not be equal to the angular displacement of bushing 12c. If, however, as stated above, the angles α with respect to each bushing are equal, each bushing will rotate through the same angular displacement and will accommodate a linear expansion of the material between the bushing and SP which is proportional to the separation between the selected point and the bushing.

Figure 4:
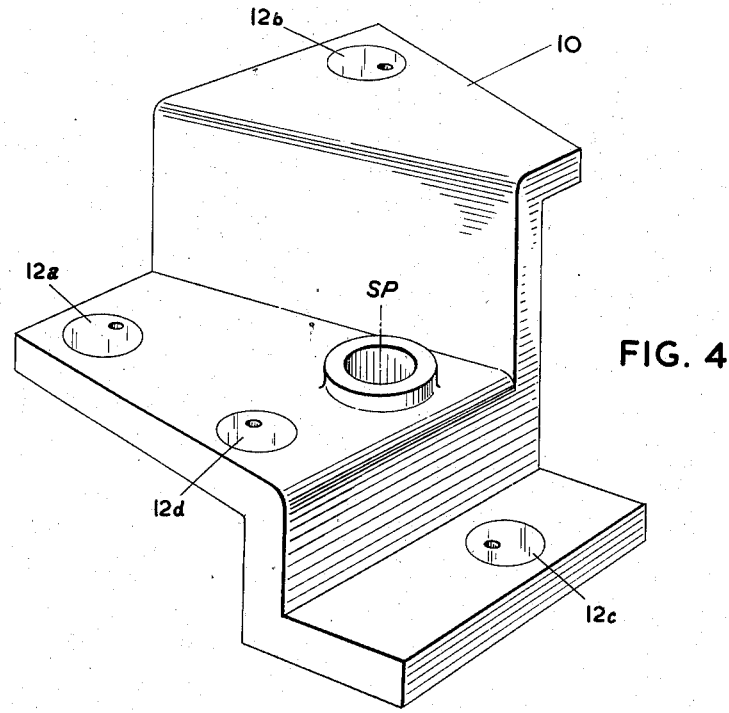
Figure 4 is a perspective view of the invention embodied in a slightly different form.

Referring to Figure 4 it will be seen that the member 10, for example need not be a planar member as shown in Figures 1 and 2. The fact that, in Figure 4, bushing 12c is in a different plane from bushings 12a and 12d and that bushing 12b is in still a different plane is immaterial to the operation of the device since all forces are exerted in a direction normal to the axes of the bushings and their planar separation may be ignored.

Figure 5:
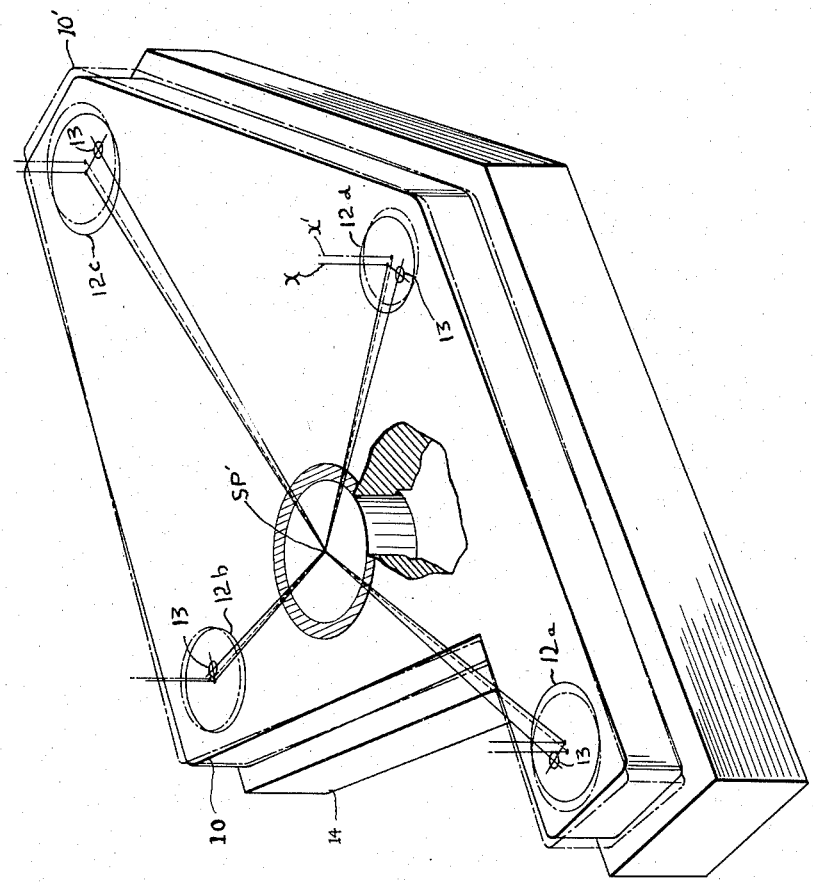
Figure 5 is a perspective view of the device shown in Figures 1 to 3 which shows, in dotted lines, the position of the various parts after expansion.

Referring now to Figure 5 the device shown in Figures 1 to 3 can be seen in perspective, the position of the bushings 12a, 12b, 12c, and 12d, and the position of the plate 10 being shown in solid lines before expansion of the plate 10 has taken place, their position after expansion being shown in dotted lines.

As has been stated earlier in the specification the invention will function in an identical manner regardless of whether the plate 10 expands relative to the plate 14 or whether the plate 14 contracts relative to the plate 10. Accordingly, for the description of Figure 5 it is intended to discuss the operation of the invention on the assumption that the plate 10 is expanding relative to the plate 14 and, for the purposes of this discussion, plate 14 will be considered to be experiencing no increase in temperature and, accordingly, it will remain unchanged in all its dimensions.

Accordingly, each of the pins 13 which, as may be seen from Figure 2, are rigidly secured to the plate 14 will remain unchanged and, accordingly, no movement between them will take place. Only the plate 10 and the bushings 12a, 12b, 12c and 12d carried thereby will move.

When the plate 10 expands due to a rise in temperature the bushings 12a to 12d inclusive will each move slightly farther away from the selected point SP' as has been described above. Since, however, the pins 13 do not move the centres of the bushings 12a to 12d will travel in arcs the radius of which is the axis of the pin 13 in each case. Considering, for the sake of clarity, the movement of bushing 12d, as expansion takes place it moves from the position shown in solid line to the position shown in dotted line and, accordingly, its axis indicated by the line X will move to the position indicated by the dotted line X'. This movement is in an arc about the axis of the pins 13 which, as mentioned above, remain stationary. It is evident that this movement in an arc about the axis of the pin 13 will result in a displacement of the axis X of the bushing 12d to the position X' in an angular direction about the selected point SP'. Accordingly, the entire plate 10 will experience a slight angular displacement about the selected point SP' as can be seen in Figure 5 wherein the angularly displaced position of the plate 10 is shown in dotted lines represented by the reference character 10'.

The angular displacement of the plate 10 about the selected point SP' is, of no consequence, since the only object which the invention is attempting to attain is to maintain the position of the selected point SP' superimposed upon the position of selected point SP" in plate 14. Their angular relationship is immaterial.

The above description has been based upon the assumption that the plate 10 expanded while plate 14 did not expand. Obviously, if plate 14 also expanded although not to the same extent that plate 10 expanded identical conditions would exist although the angular displacement of plate 10 relative to plate 14 would be somewhat less. Similarly, if plate 10 expanded and plate 14 contracted the angular displacement would be increased.

From the foregoing description it will be seen that a coupling has been devised which will maintain a constant positional relationship between a selected point on one member and a corresponding selected point on another member during change in dimensions of one member relative to the other within the limits permitted by the eccentricity of the bushings.

The invention has been described with relation to one preferred embodiment and it will be appreciated that minor modifications may be made without departing from the spirit of the invention as defined in the appended claims.

What I claim as my invention is:

1. Structure for coupling a first member to a second member for a selected point on the first member to maintain a constant position in relation to a corresponding selected point on the second member during expansion of one member relative to the other comprising a first member having a series of at least three bores, the bores having internal surfaces of revolution and axes which are parallel to each other, a bushing in each bore in the series, the bushing having an external surface complementary to the internal surface of the bore, each bushing having a hole therein eccentric with the bushing, the axis of each hole being parallel to the axis of each bushing, a series of pins on the second member equal in number to the number of bushings in the first member, the axis of each pin being parallel to the axis of each bushing, the pins being located for one pin to be received in the hole in each bushing, a first angle subtended at the selected point on the first member by a line joining the axis of a bushing and the axis of the hole in that bushing being equal to a similar angle associated with each other bushing and a second angle subtended at the axis of each bushing by a line joining the axis of the bushing and the centre of the eccentric hole in that bushing and a line joining the axis of the bushing and the selected point being equal to a similar angle associated with each other bushing, the second angle being greater than 0° and less than 180°.

2. Structure for coupling a first member to a second member for a selected point on the first member to maintain a constant position in relation to a corresponding selected point on the second member during expansion of one member relative to the other member comprising a first member having a series of at least three bores, the bores having internal surfaces of revolution and axes which are parallel to each other, a bushing in each bore in the series, the bushing having an external surface complementary to the internal surface of the bore, each bushing having a hole therein eccentric with the bushing, the axis of each hole being parallel to the axis of each bushing, a series of pins on the second member equal in number to the number of bushings in the first member, the axis of each pin being parallel to the axis of each bushing, the pins being located for one pin to be received in the hole in each bushing, a first angle subtended at the selected point on the first member by a line joining the axis of a bushing and the axis of the hole in that bushing being equal to a similar angle associated with each other bushing and a second angle subtended at the axis of each bushing by a line joining the axis of the bushing and the centre of the eccentric hole in that bushing and a line joining the axis of the bushing and the selected point being equal to a similar angle associated with each other bushing, the second angle being greater than 0° and less than 180°, the eccentric hole in each bushing being on the side of a line joining the axis of that bushing and the selected point remote from the eccentric hole of an adjacent bushing.

No references cited.